(12) United States Patent
Kudo et al.

(10) Patent No.: US 9,023,130 B2
(45) Date of Patent: May 5, 2015

(54) METHOD FOR SEPARATING POSITIVE-POLE ACTIVE SUBSTANCE AND METHOD FOR RECOVERING VALUABLE METALS FROM LITHIUM ION BATTERY

(75) Inventors: Keiji Kudo, Ehime (JP); Hitoshi Ishida, Ehime (JP); Satoshi Asano, Ehime (JP); Yukie Kawakami, Ehime (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 36 days.

(21) Appl. No.: 13/991,512

(22) PCT Filed: Dec. 14, 2011

(86) PCT No.: PCT/JP2011/078972
§ 371 (c)(1),
(2), (4) Date: Jun. 4, 2013

(87) PCT Pub. No.: WO2012/081645
PCT Pub. Date: Jun. 21, 2012

(65) Prior Publication Data
US 2013/0247721 A1 Sep. 26, 2013

(30) Foreign Application Priority Data

Dec. 14, 2010 (JP) .................................. 2010-278196

(51) Int. Cl.
*C22B 7/00* (2006.01)
*C22B 26/12* (2006.01)
(Continued)

(52) U.S. Cl.
CPC ................ *C22B 7/008* (2013.01); *C22B 26/12* (2013.01); *H01M 10/0525* (2013.01); *Y02E 60/122* (2013.01); *C22B 23/0461* (2013.01)

(58) Field of Classification Search
CPC .... C22B 7/008; C22B 26/12; C22B 23/0461; H01M 10/0525
USPC ........................................................ 75/743
See application file for complete search history.

(56) References Cited

U.S. PATENT DOCUMENTS

2012/0312126 A1* 12/2012 Yamaguchi et al. ............ 75/743

FOREIGN PATENT DOCUMENTS

CN  102412430 A  *  4/2012
JP  A-07-207349  8/1995
(Continued)

OTHER PUBLICATIONS

International Search Report issued in Application No. PCT/JP2011/078972; Dated Mar. 13, 2012 (With Translation).

*Primary Examiner* — George Wyszomierski
*Assistant Examiner* — Tima M McGuthry Banks
(74) *Attorney, Agent, or Firm* — Oliff PLC

(57) ABSTRACT

The present invention aims at improving a recovery rate of a positive-pole active substance and preventing a recovery loss of valuable metals when a positive-pole active substance is separated from a lithium ion battery. In the present invention, a material resulting from battery dismantling obtained by dismantling a lithium ion battery is stirred using a surfactant solution, whereby a positive-pole active substance is separated from a positive-electrode substrate. Also, it is preferable that an alkaline solution is added to a positive-electrode material of a material resulting from battery dismantling, thereby dissolving a positive-electrode substrate to which a positive-pole active substance adheres to obtain a slurry containing the positive-pole active substance, and a surfactant solution is added to the slurry to disperse the positive-pole active substance in the slurry, whereby the positive-pole active substance is separated from the alkaline solution.

7 Claims, 3 Drawing Sheets

(51) Int. Cl.
*H01M 10/0525* (2010.01)
*C22B 3/00* (2006.01)

(56) References Cited

FOREIGN PATENT DOCUMENTS

| | | | |
|---|---|---|---|
| JP | A-08-020825 | 1/1996 |
| JP | A-08-022846 | 1/1996 |
| JP | A-10-162868 | 6/1998 |
| JP | A-10-330855 | 12/1998 |
| JP | A-2003-157913 | 5/2003 |
| JP | A-2004-342524 | 12/2004 |
| JP | 2011195948 A | * | 10/2011 |

* cited by examiner

METHOD FOR SEPARATING POSITIVE-POLE ACTIVE SUBSTANCE AND METHOD FOR RECOVERING VALUABLE METALS FROM LITHIUM ION BATTERY

FIELD OF THE INVENTION

The present invention relates to a method for separating a positive-pole active substance and a method for recovering valuable metals from a lithium ion battery by applying the method for separating a positive-pole active substance thereto.

The present application asserts priority rights based on JP Patent Application 2010-278196 filed in Japan on Dec. 14, 2010. The total contents of disclosure of the Patent Application of the senior filing date are to be incorporated by reference into the present Application.

BACKGROUND OF THE INVENTION

Effective utilization of electric power has been called for against the recent trend of global warming. As one of means of effective utilization of electric power, secondary batteries for electric power energy storage have been expected, and from a viewpoint of air pollution prevention, it has been expected that large-size secondary batteries are put to practical use early as a power source for automobiles. Also, particularly, with the proliferation and the performance improvement of electrical equipment, such as digital cameras and cellular phones, the demand of small-size secondary batteries as a power source for backup for computers and the like, or as a power source for small-size electrical household appliances is increasing steadily year by year.

As these secondary batteries, there is required a secondary battery having a performance corresponding to electrical equipment to be used, and, generally, lithium ion batteries are mainly used.

The lithium ion battery is configured such that a negative-electrode material in which a negative-pole active substance, such as graphite, adheres to a negative-electrode substrate made of copper foil; a positive-electrode material in which a positive-pole active substance, such as lithium nickelate or lithium cobaltate, adheres to a positive-electrode substrate made of aluminum foil; a collector made of aluminum or copper; a separator made of a resin film, such as a polypropylene porous film; and an electrolytic solution, an electrolyte, and the like are enclosed inside an exterior can made of metal, such as aluminum or iron.

While the demand of lithium ion batteries is increasing, establishment of a countermeasure against environmental pollution due to used lithium ion batteries has been strongly desired, and the recovery and effective use of valuable metals have been considered.

As a method for recovering valuable metals from a lithium ion battery having the above-mentioned structure, dry treatment or incineration treatment, such as treatments disclosed in PTL 1 and PTL 2, has been used. However, these methods have disadvantages that consumption of thermal energy is large and, moreover, lithium (Li) and aluminum (Al) can not be recovered. Furthermore, there is a problem that, in the case where lithium hexafluorophosphate ($LiPF_6$) is contained as an electrolyte, a furnace material is greatly consumed.

For these problems of such dry treatment or incineration treatment, there has been proposed a method for recovering valuable metals by wet treatment, as disclosed in PTL 3 and PTL 4. As this method by wet treatment, there has been proposed a method such that all the materials resulting from dismantling of a lithium ion battery is dissolved by using an acidic solution or the like to recover valuable metals. However, in the case of this total dissolution method, a chemical agent is consumed for elements which excessively exist, such as aluminum, copper (Cu), iron (Fe), and the like, and therefore the method is not economical for effectively recovering valuable metals, such as nickel (Ni), cobalt (Co), lithium, and the like.

To solve this problem, there has been proposed a wet treatment by a selectively-peeling-off method, wherein a positive-electrode material is selectively peeled off from a lithium ion battery, and valuable metals are efficiently recovered from the positive-electrode material. In the method of selectively peeling off a positive-electrode material, a first chemical treatment is such that a positive-pole active substance containing valuable metals is peeled off from a positive-electrode substrate (positive-electrode foil) (Al, and the like). Conventionally, in this peeling-off treatment of a positive-pole active substance, an acidic solution, such as a sulfuric acid solution, or an alkaline solution, such as a sodium hydroxide solution, has been used. A solution to be used in this step of separating a positive-pole active substance contains a large amount of an electrolytic solution, an organic substance, and the like, each of which becomes an obstacle to subsequent recovery of valuable metals, whereby wastewater treatment is needed. Therefore, it is preferable that valuable metals are not allowed to dissolve in the solution.

However, in this peeling-off step, when an acidic solution, such as a sulfuric acid solution, is used, part of valuable metals contained in positive-pole active substance dissolve, thereby causing a recovery loss of the valuable metals.

Also, there is a problem that, when an acidic solution or an alkaline solution is used to separate a positive-pole active substance, the separated positive-pole active substance agglomerates, thereby being insufficiently separated from a positive-electrode material. This is considered because, when a positive-electrode material reacts to an added acid or an added alkali, a part of the positive-electrode material dissolves to generate hydrogen gas, and a positive-pole active substance adheres around the generated gas bubbles. Furthermore, the agglomerate of the positive-pole active substance easily adheres also to a positive-electrode material which should be separated, and therefore, for example, it is difficult to mechanically separate the positive-pole active substance from the positive-electrode material at a downstream step, thereby causing a lower recovery rate of the positive-pole active substance.

Thus, a separation treatment of a positive-pole active substance in the conventional method for recovering valuable metals from a lithium ion battery by wet treatment not only caused a recovery loss due to dissolution of valuable metals, but also caused agglomeration of a positive-pole active substance, thereby hindering a positive-pole active substance from being sufficiently separated from a positive-electrode material, and thus led to a lower recovery rate of the positive-pole active substance. This also caused a lower recovery rate of valuable metals.

PRIOR-ART DOCUMENTS

Patent Document

PTL 1: Japanese Patent Application Laid-Open No. Hei 07-207349
PTL 2: Japanese Patent Application Laid-Open No. Hei 10-330855

PTL 3: Japanese Patent Application Laid-Open No. Hei 08-22846

PTL 4: Japanese Patent Application Laid-Open No. 2003-157913

SUMMARY OF THE INVENTION

The present invention is proposed in view of such actual circumstances, and aims at providing a method for separating a positive-pole active substance, the method being capable of preventing a recovery loss of valuable metals and also improving a recovery rate of a positive-pole active substance in separation of a positive-pole active substance from a lithium ion battery; and a method for recovering valuable metals from a lithium ion battery by applying the method for separating a positive-pole active substance.

The present inventors earnestly studied to solve the above-mentioned problems, and consequently found that, in separation of a positive-pole active substance from a lithium ion battery, the use of a surfactant was able to prevent dissolution of valuable metals contained in positive-pole active substance and thereby control a recovery loss of valuable metals. Furthermore, the present inventors found that, after forming slurry containing a positive-pole active substance by adding an alkaline solution, a surfactant solution was added to the slurry, whereby a recovery loss of valuable metals was prevented and also agglomeration of the positive-pole active substance was controlled to improve a recovery rate of a positive-pole active substance.

The present invention provides a method for separating a positive-pole active substance constituting a lithium ion battery from a positive-electrode substrate, wherein a material resulting from battery dismantling obtained by dismantling a lithium ion battery is stirred using a surfactant solution, whereby a positive-pole active substance is separated from a positive-electrode substrate.

Also, the present invention provides a method for recovering valuable metals from a lithium ion battery, the method comprising the step of separating a positive-pole active substance, wherein a material resulting from battery dismantling obtained by dismantling a lithium ion battery is immersed in a surfactant solution and stirred, whereby a positive-pole active substance is separated from a positive-electrode substrate.

Here, in the above-mentioned method for separating a positive-pole active substance and the above-mentioned method for recovering valuable metals from a lithium ion battery by applying the method for separating a positive-pole active substance, it is preferable that an alkaline solution is added to a positive-electrode material of a material resulting from battery dismantling obtained by dismantling a lithium ion battery, whereby a positive-electrode substrate to which a positive-pole active substance adheres is dissolved to obtain a slurry containing the positive-pole active substance, and a surfactant solution is added to the slurry to disperse the positive-pole active substance in the slurry, whereby the positive-pole active substance is separated from the alkaline solution.

Effects of Invention

According to the present invention, in separation of a positive-pole active substance from a positive-electrode material which constitutes a lithium ion battery, a stirring treatment is performed using a surfactant solution, whereby dissolution of valuable metals contained in the positive-pole active substance is controlled, a recovery loss of valuable metals is prevented, and the positive-pole active substance is effectively separated.

Also, according to the present invention, after obtaining a slurry of a positive-pole active substance by using an alkaline solution, a treatment using a surfactant solution is performed, whereby agglomeration of the positive-pole active substance is controlled and the positive-pole active substance is effectively separated, and thus a recovery rate of a positive-pole active substance can be improved and also a recovery loss of valuable metals can be prevented.

BRIEF DESCRIPTION OF DRAWINGS

FIG. 3A is an appearance photograph of a not less than 2380 μm substance after sieving in Example 5, while FIG. 3B is an appearance photograph of a not less than 2380 μm substance after sieving in Comparative Example 2.

DETAILED DESCRIPTION OF THE INVENTION

Figure 1:
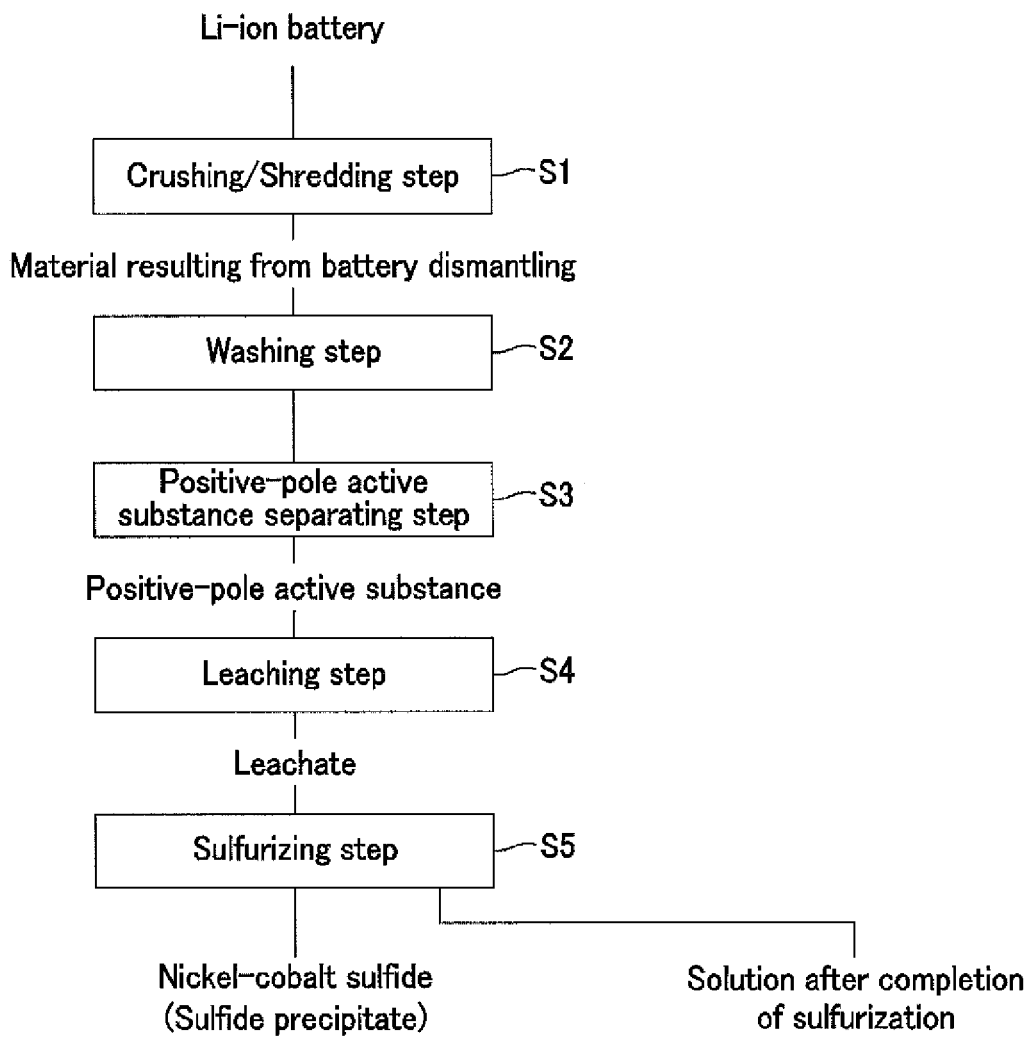
FIG. 1 illustrates a flowchart of a method for recovering valuable metals from a lithium ion battery.

Hereinafter, a method for separating a positive-pole active substance and a method for recovering valuable metals from a lithium ion battery by applying the separation method according to the present invention will be explained in detail with reference to the drawings in the following order.

1. Summary of the present invention
2. Method for recovering valuable metals from a lithium ion battery
3. Another embodiment
4. Examples <1. Summary of the Present Invention>

The present invention provides a method for separating a positive-pole active substance and a method for recovering valuable metals from a lithium ion battery by applying the method for separating a positive-pole active substance, wherein a positive-pole active substance constituting a lithium ion battery is separated from a positive-electrode substrate (positive-electrode foil) by using a surfactant solution.

Conventionally, in a treatment to separate a positive-pole active substance containing valuable metals from positive-electrode foil (Al, or the like), an acidic solution or the like was used. However, when an acidic solution was used to separate a positive-pole active substance, valuable metals to be recovered were dissolved in the acidic solution, and therefore a recovery loss of valuable metals was caused.

Accordingly, in the present invention, when a positive-pole active substance is separated, a mechanical stirring treatment is performed using a surfactant solution. Thus, a recovery loss of valuable metals resulting from dissolution of valuable metals in a solution can be controlled, and a positive-pole active substance can be effectively separated and recovered from a positive-electrode substrate.

Also, in the present invention, it is preferable that, after a slurry containing a positive-pole active substance is obtained by using an alkaline solution, a surfactant solution is added to the slurry. More specifically, an alkaline solution is added to a positive-electrode material of a material resulting from battery dismantling obtained by dismantling a lithium ion battery, whereby a positive-electrode substrate to which a positive-pole active substance adheres is dissolved and thereby a slurry containing the positive-pole active substance is obtained, and then a surfactant is added to the obtained slurry to disperse the positive-pole active substance in the slurry and thereby to separate the positive-pole active substance from the alkaline solution.

Conventionally, when a positive-electrode material reacted to an added acid or an added alkali, a part of the positive-electrode material dissolved to generate hydrogen gas, and a positive-pole active substance adhered around the generated gas bubbles, whereby a positive-pole active substance, which should have been peeled off and separated, agglomerated. The positive-pole active substance which thus agglomerated kept adhering to a separated positive-electrode substrate or the like, and therefore it was not achieved to effectively recover only a positive-pole active substance, whereby a recovery rate of a positive-pole active substance was decreased.

Against this, as mentioned above, after obtaining a slurry containing a positive-pole active substance by using an alkaline solution, a surfactant solution is added to the slurry, whereby the surfactant prevents the positive-pole active substance from agglomerating on the surface of hydrogen gas, and the positive-pole active substance can be dispersed in fine form in the slurry. Then, the slurry in which the positive-pole active substance is dispersed is separated into the positive-pole active substance and the alkaline solution containing the positive-electrode substrate, whereby not only a recovery loss of valuable metals due to dissolution of valuable metals in the solution can be controlled, but also only a positive-pole active substance can be effectively separated and recovered at a high recovery rate.

Hereinafter, the present invention will be explained in more details by mentioning a specific embodiment concerning a method for recovering valuable metals from a lithium ion battery to which the present invention is applied (hereinafter, referred to as "the present embodiment").

<2. Method for Recovering Valuable Metals from a Lithium Ion Battery>

First, with reference to a flowchart illustrated in FIG. 1, a method of recovering valuable metals from a lithium ion battery in the present embodiment is explained as follows. As shown in FIG. 1, the method of recovering valuable metals has a crushing/shredding step S1, a washing step S2, a positive-pole active substance separating step S3, a leaching process S4, and a sulfurizing step S5. Note that the method of recovering valuable metals from a lithium ion battery is not limited to these steps, but may be suitably changed.

(1) Crushing/Shredding Step

In the crushing/shredding step S1, a battery is dismantled by crushing/shredding in order to recover valuable metals from a used lithium ion battery. At this time, if a battery is in a charged condition, such condition is dangerous, therefore, the battery is preferably discharged prior to being dismantled, and thereby made harmless. Note that, in the discharging treatment, a discharging liquid, such as a sodium sulfate solution or a sodium chloride solution, is used, and a used battery is immersed in the solution, to be discharged.

In the crushing/shredding step S1, the battery made harmless is dismantled to an appropriate size by using a conventional crusher and a conventional shredder. Also, an exterior can is cut and a positive-electrode material and a negative-electrode material inside an exterior can may be separated and dismantled, but in this case, each separated part is preferably further cut into an appropriate size.

(2) Washing Step

In the washing step S2, a material resulting from battery dismantling obtained through the crushing/shredding step S1 is washed by alcohol or water, whereby an electrolyte solution and an electrolyte are removed. A lithium ion battery contains organic solvents, such as ethylene carbonate, propylene carbonate, diethyl carbonate, and dimethyl carbonate; and electrolytes, such as lithium hexafluorophosphate ($LiPF_6$). Therefore, by removing these organic solvents and electrolytes in advance, organic components, phosphorus (P), fluorine (F), and the like can be prevented from being mixed as impurities into a leachate in the positive-pole active substance separating step S3 described later.

In washing of the material resulting from battery dismantling, alcohol or water is used, and a shredded battery material is fed thereinto preferably at a ratio of 10 to 300 g/l, and shaken or stirred to remove organic components and electrolytes. As the alcohol, ethanol, methanol, isopropyl alcohol, and a mixed solution of these are preferable. Carbonates constituting a battery material is generally insoluble in water, but ethylene carbonate is easily soluble in water, and other organic components also are soluble in water to a certain degree and therefore can be washed by water. Furthermore, when an amount of the material resulting from battery dismantling with respect to alcohol or water is less than 10 g/l, it is not economical, while when an amount thereof is more than 300 g/l, the material resulting from battery dismantling is bulky, and thereby difficult to be washed.

The washing of the material resulting from battery dismantling is preferably repeated two or more times. Also, the washing may be repeated with changing ingredients of washing liquid, for example, washing is performed using only alcohol first, and then washing is again performed using water. Through this washing step S2, organic components, and phosphorus, fluorine, and the like, each being derived from electrolytes, can be removed to such an extent that a downstream step is not affected.

(3) Positive-Pole Active Substance Separating Step

In the positive-pole active substance separating step S3, a positive-pole active substance which adheres to a positive-electrode substrate (positive-electrode foil) of the material resulting from battery dismantling obtained through the washing step S2 is peeled off and separated. According to the present embodiment, in this positive-pole active substance separating step S3, the following treatments are performed.

Figure 2:
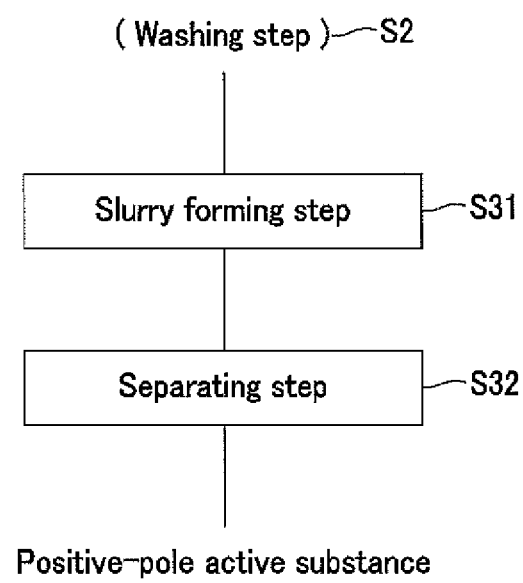
FIG. 2 illustrates treatment steps performed in a positive-pole active substance separating step S3.

That is, as illustrated in FIG. 2, the positive-pole active substance separating step S3 according to the present embodiment includes: a slurry forming step S31, wherein an alkaline solution is added to a positive-electrode material of the material resulting from battery dismantling obtained through the washing step S2, thereby dissolving a positive-electrode substrate to which a positive-pole active substance adheres, whereby a slurry containing the positive-pole active substance is obtained; and a separating step S32, wherein a surfactant solution is added to the formed slurry and stirred to disperse the positive-pole active substance in the slurry, whereby the positive-pole active substance is separated from the alkaline solution containing the positive-electrode substrate and the like.

In the present embodiment, a material resulting from battery dismantling is thus stirred using a surfactant solution, whereby dissolution of valuable metals contained in a positive-pole active substance in a solution is controlled, and a recovery loss of valuable metals can be prevented. On aluminum foil as a positive-electrode substrate, a hydrophobic compound, such as Teflon (registered trademark) or polyvinylidene fluoride (PVDF), is applied as a binding agent. Hence, it is considered that, in the present embodiment, a surfactant solution permeates through the surface and the interface of the hydrophobic compound, whereby peeling-off of a positive-pole active substance is promoted without the dissolving positive-pole active substance and the aluminum foil.

Also, in the present embodiment, with dissolving a positive-electrode substrate by an alkaline solution, a positive-pole active substance is peeled off, whereby a slurry containing the positive-pole active substance is formed, and then a surfactant is added to the slurry and stirred. Thus, agglomerates of the positive-pole active substance agglomerating in the slurry are dispersed in the slurry, whereby it can be controlled that the agglomerates adhere to a positive-electrode material obtained after peeling off the positive-pole active substance, and furthermore, since difference in size between the positive-pole active substance and the positive-electrode material becomes remarkable, only the positive-pole active substance can be effectively separated and recovered from the slurry.

(3-1) Slurry Forming Step

In the slurry forming step S31, as mentioned above, an alkaline solution is added to a positive-electrode material of a material resulting from battery dismantling obtained through the washing step S2, whereby a positive-electrode substrate to which the positive-pole active substance adheres is dissolved, and a slurry containing the positive-pole active substance is obtained.

The alkaline solution to be added in the slurry forming step S31 is not particularly limited, but sodium hydroxide, potassium hydroxide, or the like may be used.

A concentration of the alkaline solution to be added is not particularly limited, but is preferably 0.3 to 1.0 N. When a concentration of the alkaline solution is less than 0.3 N, aluminum as a portion of the positive-electrode substrate to which positive-pole active substance is not applied is dissolved, while another portion of the positive-electrode substrate to which the positive-pole active substance is applied is not fully dissolved, and there is a possibility that, even if 60 minutes pass, the positive-pole active substance is not effectively peeled off. On the other hand, when a concentration of the alkaline solution is more than 1.0 N, there is a possibility that even the positive-pole active substance is dissolved, and, from a viewpoint of economical efficiency, efficient treatment can not be performed.

Here, the term, a material resulting from battery dismantling, includes what is obtained by selecting only a positive-electrode material portion from the material resulting from battery dismantling. Therefore, this slurry forming step S31 includes both a case where an alkaline solution is added to all the material resulting from battery dismantling and a case where only a positive-electrode material portion is selected from the material resulting from battery dismantling and an alkaline solution is added thereto.

When a lithium ion battery is dismantled by crushing and the like, a positive-electrode material thereof is usually in flake form, and therefore, an alkaline solution may be added to the positive-electrode material in flake form, but, after cutting the positive-electrode material into a predetermined size in advance, an alkaline solution may be added thereto. In this case, the cutting size is not particularly limited, but preferably suitably changed depending on a treatment condition or the like. For example, a positive-electrode material is cut into pieces having a size of not more than 30 mm in length, preferably not more than 10 mm in length. Furthermore, the cutting size is preferably smaller, but, considering time and effort and cost required for the cutting, and loss and influence on environment due to scattering of the cut pieces, the cutting size is preferably not less than 2 mm in length. Thus, it is prevented that positive-electrode materials adhere each other and thereby are prevented from being dissolved by an alkali solution, whereby a positive-pole active substance can be efficiently recovered.

(3-2) Separating Step

Next, the slurry obtained by the slurry forming step S31 and containing a positive-pole active substance is sent to the separating step S32 to separate the positive-pole active substance from the alkaline solution containing a positive-electrode substrate and the like. That is, in the separating step S32, as mentioned above, a surfactant solution is added to the formed slurry and stirred, whereby the positive-pole active substance in the slurry is dispersed to separate the positive-pole active substance from the alkaline solution containing a positive-electrode substrate and the like. Thus, the treatment is performed using a surfactant solution, whereby, without dissolution of valuable metals in a solution and the resulting recovery loss of the valuable metals, the positive-pole active substance can be effectively separated and recovered from the positive-electrode substrate.

The surfactant solution to be added in the separating step S32 is not particularly limited, and any one of well-known surfactant solutions, such as a nonionic surfactant, an anionic surfactant, a cationic surfactant, or the like, may be used. These may be used alone, or two or more kinds of these may be used in combination.

Specifically, examples of the nonionic surfactant include polyoxyethylene octylphenyl ether, polyoxyethylene nonylphenyl ether, and polyoxyethylene lauryl ether. Examples of the anionic surfactant include alkyl diphenyl ether disulfonate and a salt thereof, bisnaphthalene sulfonate and a salt thereof, polyoxyalkyl sulfosuccinic acid ester and a salt thereof, and sulfuric ester of polyoxyethylene phenyl ether and a salt thereof. Examples of the cationic surfactant include tetraalkylammonium salts, alkylamine salts, benzalkonium salts, alkyl pyridinium salts, and imidazolium salts.

Among these kinds of surfactants, particularly, a nonionic surfactant solution having a polyoxyalkylene ether group is preferably suitably used in view of lower foaming properties and less pH-dependence. Thus, a positive-pole active substance can be dispersed more effectively and only the positive-pole active substance can be separated.

A concentration of a surfactant solution to be added is preferably 0.1 to 10% by weight. When the concentration thereof is made to be not less than 0.1% by weight, a positive-pole active substance in a slurry is dispersed more effectively, and the positive-pole active substance can be recovered at a high recovery rate. When the concentration is made to be not more than 10% by weight, a positive-pole active substance can be separated effectively without an economical loss.

Here, in the separating step S32, a solution obtained by adding a surfactant solution to a slurry containing a positive-pole active substance is preferably treated by adding a physical treatment, such as stirring and sliding, thereto. Specifically, a treatment is performed using a well-known stirrer equipped with a stirring blade, for example.

A stirring speed of a stirrer may be suitably adjusted in accordance with a type and an amount of a surfactant solution added, and is preferably 300 to 850 rpm. When the stirring speed is too slow, there is a possibility that stirring effect is not fully demonstrated and a positive-pole active substance can not be effectively dispersed and separated. On the other hand, when the stirring speed is too quick, air bubbles are easily caught, which is not preferable, and furthermore, aluminum foil of a positive-electrode substrate is sheared by the stirring blade and becomes fine, thereby the sheared aluminum foil is possibly mixed with a positive-pole active substance, the positive-pole active substance can not be fully effectively separated.

A stirring time by a stirrer is preferably 30 to 120 minutes. When the stirring time is too short, a positive-pole active substance is not sufficiently dispersed. On the other hand, when the stirring time is too long, no further dispersion of a positive-pole active substance is performed, and an efficient treatment can not be conducted.

When stirring is performed using a stirrer or the like, a stirring medium is preferably used. The stirring treatment by using a stirring medium can improve stirring efficiency, and allows a positive-pole active substance in a slurry to be dispersed more efficiently, thereby separating the positive-pole active substance.

The stirring medium used for stirring is not particularly limited, but examples of the stirring medium include a silicon nitride ball; a ceramic ball made of silicon carbide, zirconia, alumina, or the like; a steel ball, such as a chrome ball (steel ball for ball bearings) or a carbon ball (carbon steel ball); a stainless steel ball; and a ball coated with a film made of titanium nitride, charcoal titanium nitride, or the like.

An amount of the stirring medium to be added is preferably 100 to 200 g, more preferably 170 to 200 g. When an amount of the stirring medium added is too small, stirring efficiency cannot be sufficiently improved. On the other hand, when an amount of the stirring medium added is too large, a recovery rate cannot be improved, which is inefficient.

As mentioned above, in the positive-pole active substance separating step S3, there are performed the slurry forming step S31, wherein an alkaline solution is added to a positive-electrode material of a material resulting from battery dismantling, whereby a positive-electrode substrate to which a positive-pole active substance adheres is dissolved to obtain a slurry containing the positive-pole active substance; and the separating step S32, wherein a surfactant solution is added to the formed slurry to disperse the positive-pole active substance contained in the slurry, whereby the positive-pole active substance is separated from the alkaline solution containing the positive-electrode substrate and the like. Thus, dissolution of valuable metals is controlled to reduce a recovery loss of valuable metals to be recovered, and also agglomeration of a positive-pole active substance and adhesion of agglomerates thereof to the positive-electrode material can be controlled, whereby only the positive-pole active substance can be recovered effectively at a high recovery rate.

Note that, in the case where not only a positive-electrode material but also all of the materials resulting from battery dismantling are treated, negative-electrode powder, such as graphite, which is a negative-pole active substance, and what accompanies with the negative-electrode powder are also contained in a slurry, but these are separated together with the positive-electrode substrate by the above-mentioned treatment in the separating step S32, and only a positive-pole active substance can be effectively recovered.

(4) Leaching Step

In the leaching step S4, the positive-pole active substance recovered through the positive-pole active substance separating step S3 is leached by an acidic solution and made into a shiny. By this leaching step S4, the positive-pole active substance is dissolved in an acidic solution, and valuable metals constituting the positive-pole active substance, such as nickel, and cobalt, are made into metal ions.

As the acidic solution used for dissolution of the positive-pole active substance, besides mineral acid, such as sulfuric acid, nitric acid, or hydrochloric acid, organic acid or the like may be used. Among these, it is industrially preferable to use a sulfuric acid solution from viewpoints of cost, work environment, and recovery of nickel, cobalt, and the like from a leachate. The pH of an acidic solution to be used is preferably at least not more than 2, more preferably controlled to be approximately 0.5 to 1.5 from a viewpoint of reactivity. As a dissolution reaction of a positive-pole active substance proceeds, the pH increases, and therefore, it is preferable that acid, such as sulfuric acid, is further added also during the reaction, whereby the PH is maintained at approximately 0.5 to 1.5.

Also, in the leaching step S4, a metal and a compound each of which has a high reducibility, such as nickel metal and a material containing fixed carbon, are added to an acidic solution, whereby a leaching rate of nickel and cobalt from a positive-pole active substance can be improved. Examples of the material containing fixed carbon to be used include graphite (not less than 95% of fixed carbon), activated carbon (not less than 90% of fixed carbon), coal (30 to 95% of fixed carbon), coke (75 to 85% of fixed carbon), and charcoal (approximately 85% of fixed carbon). Furthermore, negative-electrode powder recovered before the leaching step S4 also can be used because the negative-electrode powder contains graphite as a principal component, which is effective in view of total recycling.

For example, an amount of a metal having a high reducibility, such as nickel metal, to be added is preferably 0.5 to 2.0 times moles with respect to the number of moles of a positive-pole active substance to be dissolved. Furthermore, it is preferable to adjust by adding metal or blowing air or oxygen so that oxidation reduction potential (ORP) (reference electrode: silver/silver-chloride electrode) is in a range of −100 to 550 mV. With adjusting so as to achieve such ORP range, a metal having a high reducibility is added, whereby the added metal can be effectively dissolved.

Generally, an amount of a material containing fixed carbon to be added is preferably approximately 50 to 300% by weight in carbon content with respect to a weight of a positive-pole active substance to be dissolved, and, in the case of graphite and negative-electrode powder, each of which has a high fixed-carbon content, an amount to be added is preferably approximately 50 to 100% by weight. Note that the material containing fixed carbon can be recovered after completion of the dissolution reaction, and re-used.

(5) Sulfurizing Step

In the sulfurizing step S5 the leachate obtained through the leaching step S4 is sulfurized to form nickel-cobalt mixed sulfide, whereby valuable metals nickel (Ni) and cobalt (Co) are recovered from a lithium ion battery. Note that, prior to the sulfurizing step S5, the leachate obtained through the leaching step S4 may be neutralized with a neutralizing agent to separate and recover a very small amount of aluminum, copper, and the like, each being contained in the leachate.

In the sulfurizing step S5, the leachate obtained through the leaching step S4 is introduced into a reaction vessel, and a sulfurizing agent is added thereto to induce a sulfurization reaction. As the sulfurizing agent, alkali sulfide, such as sodium sulfide or sodium hydrosulfide, may be used.

Specifically, in the sulfurizing step S5, nickel ions (or cobalt ions) contained in the leachate become sulfide by sulfurization reaction with alkali sulfide in accordance with the following chemical formula, (I), (II), or (III).

$$Ni^{2+}+H_2S => NiS+2H^+ \qquad (I)$$

$$Ni^{2+}+NaHS => NiS+H^++Na^+ \qquad (II)$$

$$Ni^{2+}+Na_2S => NiS+2Na^+ \qquad (III)$$

An amount of a sulfurizing agent to be added in the sulfurizing step S5 is preferably not less than 1.0 equivalent with respect to nickel and cobalt contents in a solution. When an amount of a sulfurizing agent to be added is not less than 0.1 equivalents, a concentration of nickel and cobalt in the solution can be not more than 0.001 g/l.

However, in operation, it is sometimes difficult to analyze a concentration of nickel and cobalt in a leachate precisely and quickly, and therefore, a sulfurizing agent is more preferably added to the extent that any further addition of the sulfurizing agent does not cause a variation of ORP in a reaction solution. Usually, the reaction is completed in a range of −200 to 400 mV (reference electrode: silver/silver-chloride electrode), and therefore, the sulfurizing agent is preferably added based on the ORP value. Thus, nickel and cobalt which are leached in a solution can be sulfurized sufficiently, and these valuable metals can be recovered at a high recovery rate.

The pH of a solution used for the sulfurization reaction in the sulfurizing step S5 is preferably approximately pH 2 to 4. A temperature of the sulfurization reaction in the sulfurizing step S5 is not particularly limited, but preferably 0 to 90 degrees C., more preferably approximately 25 degrees C.

As mentioned above, by the sulfurization reaction in the sulfurizing step S5, nickel and cobalt contained in a positive-pole active substance of a lithium ion battery can be recovered as nickel-cobalt sulfide (sulfide precipitate).

<3. Another Embodiment>

Note that a method for recovering valuable metals from a lithium ion battery according to the present embodiment is not limited to the method comprising the above-mentioned each step, but may be suitably changed unless the essentials of the present invention are changed.

(Another Embodiment of Sulfurizing Step)

An example of performing a sulfurization reaction by alkali sulfide was explained in the sulfurizing step S5 mentioned above, but, for example, a sulfurization reaction may be induced using hydrogen sulfide as a sulfurizing agent. In other words, the sulfurization reaction using hydrogen sulfide is such that a solution obtained through the neutralization step S5 is introduced into a reaction vessel comprising a pressure vessel having a pressure resistance, and gas for sulfurizing which contains hydrogen sulfide is blown into a gas phase of the reaction vessel, whereby a sulfurization reaction by hydrogen sulfide is induced in a liquid phase.

This sulfurization reaction using hydrogen sulfide is performed based on a predetermined oxidation reduction potential which depends on the hydrogen sulfide concentration in a gas phase, in accordance with the following chemical formula (IV).

$$MSO_4 + H_2S \Rightarrow MS + H_2SO_4 \qquad (IV)$$

(In the chemical formula, M represents Ni and Co.)

The pressure in a reaction vessel in the sulfurization reaction in the above-mentioned chemical formula (IV) is not particularly limited, but preferably 100 to 300 kPa. Furthermore, the reaction temperature is not particularly limited, but preferably 65 to 90 degrees C.

(Another Embodiment of Recovery of Nickel and Cobalt)

A method for recovering valuable metals from a lithium ion battery according to the present invention is not limited a method for recovering valuable metals nickel and cobalt as sulfide by sulfurization reaction using alkali sulfide and hydrogen sulfide.

Specifically, for example, as a step of recovering nickel and cobalt, a neutralizing agent may be added to a mother liquor obtained through the leaching step S4, thereby adjusting the mother liquor to pH 6.5 to 10.0 so that a precipitate of nickel and cobalt is formed. By this step of recovering nickel and cobalt, nickel and cobalt contained in a lithium ion battery are recovered. As the neutralizing agent used here, common chemicals, such as soda ash, slaked lime, and sodium hydroxide, may be used.

(Another Embodiment Including Dephosphorization and Defluorination Step)

Also, a method for recovering valuable metals from a lithium ion battery according to the present invention may be such that, prior to recovering valuable metals nickel and cobalt by a sulfurization reaction or the like, as a dephosphorization and defluorination step, there is removed phosphorus (P) and fluorine (F), each being derived from lithium hexafluorophosphate ($LiPF_6$) or the like as an electrolyte contained in a leachate of a positive-pole active substance.

Specifically, at least one kind of compounds selected from the group consisting of a Ca compound, a Mg compound, an Al compound, and a rare earth compound is added to a leachate of a positive-pole active substance, and the pH of the leachate is adjusted to pH 2.0 to 4.0, preferably approximately pH 3.0. Thus, fluoride and phosphate of F and P, the F and P being contained in the leachate without being removed in the washing step S2, can be formed and precipitated. Furthermore, the precipitate is removed from the leachate, whereby P and F can be effectively removed from the leachate, and therefore, without contamination by P and F, valuable metals nickel and cobalt can be effectively and efficiently recovered.

Examples of the Ca compound, the Mg compound, and the Al compound, which are to be added, include hydroxide, chloride, nitrate, and sulphate. Also, examples of the rare earth compound include hydroxide, chloride, nitrate, and sulphate of Sc, Y, La, Ce, Pr, Nd, Sm, Eu, Gd, Tb, Dy, Ho, Er, Tm, Yb, and Lu.

EXAMPLES

Hereinafter, specific examples according to the present invention will be described. Note that the present invention is not limited to any one of the following examples.

Example 1

A discharged lithium ion battery was dismantled into pieces not more than 1 cm square by a double shaft crusher. Then, 10 g of this material resulting from battery dismantling were immersed in 300 ml of water, and washed after removal of a matter adhering to the surface, which is easily soluble in water. Then, the material resulting from battery dismantling was allowed to pass through a 40-mesh liquid filter pipe, and a weight of the material resulting from battery dismantling and an active substance adhering thereto was measured.

Next, this was returned to water again, and 1.8% by weight of polyoxyethylene octylphenyl ether (EMULGEN series, manufactured by Kao Corporation) as a surfactant solution was added thereto. Furthermore, 135 g of beads (material: zirconia) having a diameter of 2 mm were added as a stirring medium, and a stirring treatment was performed.

The material resulting from battery dismantling fed in a surfactant was stirred using a stirrer (HEIDON Three-One Motor FBL1200, manufactured by SHINTO Scientific Co., Ltd.), at 850 rpm of stirring speed by a stirring blade of the stirrer for 60 minutes of stirring time, whereby a positive-pole active substance was separated and recovered from the material resulting from battery dismantling. After the stirring treatment, a positive-pole active substance (a) was separated from beads and the material resulting from battery dismantling, such as foil, by using a sieve with a sieve opening of 1.8 mm.

The beads and the material resulting from battery dismantling, such as foil, on the sieve were immersed in 50 ml of 8 mol/l NaOH, and aluminum foil is again dissolved by using a sieve with a sieve opening of 1.8 mm, whereby a residual positive-pole active substance (b) was separated from beads and material resulting from battery dismantling except foil.

(Result)

Since the recovered positive-pole active substance (b) became a loss, a recovery rate of a positive-pole active substance was obtained by a formula shown below.

Recovery Rate (%)=Active Substance (a)/(Active Substance (a)+Active Substance (b))×100

As a result, in Example 1, a positive-pole active substance was separated and recovered at a high recovery rate, namely 89.6%. Furthermore, a solution containing the active material sieved out at this time was filtered using a 5C filter paper with a sieve opening of 1 μm, and the solution was analyzed, and as a result, the contents of Co, Ni, and Al, which are main valuable metals contained in the active substance, were less than a lower detection limit (1 mg/l). Hence, it was found that, without allowing valuable metals, which should be recovered, to dissolve in a solution, a positive-pole active substance was effectively separated.

Comparative Example 1

In Comparative Example 1, 2.67 g of the above-mentioned material resulting from battery dismantling used in Example 1 was immersed in 210 ml of water and continued to be stirred for 60 minutes, and a recovery rate of a positive-pole active substance was calculated. In other words, there was calculated a recovery rate in the case where only stirring treatment was performed without using a surfactant solution.

As a result, there was obtained only an extremely lower recovery rate, namely 25%, as compared with that in Example 1.

Example 2

Next, using the same method as in Example 1, how much influence a difference in an amount of a surfactant solution added had on a recovery rate of a positive-pole active substance was examined. Conditions and an amount of each material except an amount of a surfactant solution added were the same as those in Example 1. Table 1 shows each amount of a surfactant solution added and each recovery rate.

TABLE 1

| Sample | Added Amount (wt %) | Active Substance Recovery Rate (%) |
|---|---|---|
| Sample 1 | 1.8 | 89.6 |
| Sample 2 | 3.3 | 89.2 |
| Sample 3 | 6.6 | 92.2 |
| Sample 4 | 9.9 | 91.7 |

As shown in Table 1, when an amount of a surfactant added is 1.8 to 9.9% by weight, a recovery rate of not less than 89% was achieved in each case.

Furthermore, 6.35 g of the material resulting from battery dismantling used in Example 1 was immersed in 127 ml of water and 0.1% by weight of a surfactant solution was added, and then stirring was continued for 60 minutes, and a recovery rate was calculated by the same method as in Example 1.

As a result, a recovery rate was slightly low, namely 75%, but as compared with Comparative Example 1, wherein treatment is performed without a surfactant solution, the above-mentioned recovery rate was higher.

Example 3

Next, using the same method as in Example 1, how much influence a difference in an amount of beads added had on a recovery rate of a positive-pole active substance was examined. Conditions and an amount of each material except an amount of beads added were the same as those in Example 1. Table 2 shows each amount of beads added and each recovery rate.

TABLE 2

| Sample | Added Amount (wt %) | Active Substance Recovery Rate (%) |
|---|---|---|
| Sample 5 | 100 | 86.1 |
| Sample 1 | 135 | 89.6 |
| Sample 6 | 170 | 94.9 |
| Sample 7 | 200 | 94.4 |

As shown in Table 2, when an amount of beads added was 100 to 200 g, a positive-pole active substance was recovered at a high recovery rate, namely not less than 85%, in each case. Particularly, when not less than 170 g of beads were added, a positive-pole active substance was recovered at a higher recovery rate, namely not less than 94%.

Example 4

Next, using the same method as in Example 1, how much influence a difference in stirring time by a stirrer had on a recovery rate of a positive-pole active substance was examined. In Example 4, conditions and an amount of each material were the same as those in Example 1, except that an amount of a surfactant added was 3.3% by weight and a stirring time was changed. Table 3 shows each stirring time and each recovery rate.

TABLE 3

| Sample | Time (h) | Active Substance Recovery Rate (%) |
|---|---|---|
| Sample 8 | 0.5 | 37.6 |
| Sample 2 | 1 | 89.2 |
| Sample 9 | 2 | 95.5 |

As shown in Table 3, when a stirring time was for 30 minutes (0.5 h), a recovery rate was low, namely 37.6%, and a positive-pole active substance was not effectively peeled off. On the other hand, when stirring was continued for not less than 1 hour, a recovery rate was not less than 89%, and particularly, when stirring was continued for not less than 2 hours, a recovery rate was not less than 95% and a positive-pole active substance was effectively separated.

Example 5

A discharged lithium ion battery was dismantled into pieces not more than 1 cm square by a double shaft crusher, and 118.3 g of the material resulting from battery dismantling were immersed in 1068 ml of pure water, and washed after removal of a matter adhering to the surface, the matter being easily soluble in water.

A sodium hydroxide solution which had been adjusted to have a concentration of 0.6 N was first added to this solution, and, with stirring at 400 rpm of stirring speed for 60 minutes, aluminum as a positive-electrode substrate was dissolved, whereby a positive-pole active substance adhering to the positive-electrode substrate was peeled off and a slurry containing the positive-pole active substance was formed.

Next, 1 ml of a NEOPELEX solution (concentration of 0.1 wt %) as a surfactant solution was added to the formed slurry, and surfactant treatment was conducted at 300 rpm of stirring speed for 30 minutes.

After the surfactant treatment, the slurry was separated into a filtrate and a residue, using a 5C filter paper. Then, the residue was allowed to pass through each mesh of 2380 μm, 850 μm, and 75 μm, thereby being sieved out, whereby a positive-pole active substance, which was a recovery target, was separated and recovered.

Comparative Example 2

The same treatment was performed as in Example 1, except that there was used 108.35 g of a material resulting from battery dismantling obtained in such a manner that a discharged lithium ion battery was dismantled into pieces not more than 1 cm square by a double shaft crusher; and surfactant treatment by a surfactant was not performed.

In other words, a positive-electrode substrate was dissolved by a sodium hydroxide solution having a concentration of 0.6 N, whereby a positive-pole active substance adhering to the positive-electrode substrate was peeled off, and then a residue was separated from a filtrate using a 5C filter paper, and the residue was allowed to pass through each mesh of 2380 μm, 850 μm, and 75 μm, thereby being sieved out, whereby a positive-pole active substance was recovered.

Table 4 shows each weight before and after peeling-off using a sodium hydroxide solution; a total weight of a positive-pole active substance, foil (a positive-electrode substrate), and a separator after peeling-off; and an amount of aluminum dissolved after peeling-off, in Example 5 and Comparative Example 2. Also, Table 5 shows a total weight of a positive-pole active substance, foil (a positive-electrode substrate), and a separator after sieving. Here, in Table 5, a substance which was obtained by sieving out to a size of not less than 75 μm and less than 850 μm (+75 to −850 μm); and a substance which was obtained by sieving out to a size of less than 75 μm (−75 μm) were regarded as a positive-pole active substance.

Figures 3A, 3B:

FIG. 3 shows appearance photographs of a substance obtained by sieving out to a size of not less than 2380 μm in Example 5 and Comparative Example 2. Note that FIG. 3A shows an appearance photograph in Example 5 in which surfactant treatment was performed, while FIG. 3B shows an appearance photograph in Comparative Example 2 in which surfactant treatment was not performed.

TABLE 4

|  |  | Example 5 | Comparative example 2 |
|---|---|---|---|
| Before peeling-off [g] |  | 118.3 | 108.35 |
| After peeling-off | Positive-pole active substance/ Foil/Separator | 108.0 | 99.52 |

TABLE 4-continued

|  | Example 5 | Comparative example 2 |
|---|---|---|
| Amount of Al dissolved (in filtrate) [g] | 7.631 | 6.386 |
| Total [g] | 115.631 | 107.2 |
| Weight difference between before and after peeling-off [g] | 2.669 | 1.2 |

TABLE 5

| Positive-pole active substance/Foil/ Separator |  | Example 5 | Comparative example 2 |
|---|---|---|---|
| Sieving after peeling-off | (1) +2380 μm [g] | 40.03 | 55.08 |
|  | (2) +850~−2380 μm [g] | 8.11 | 0.9 |
|  | (3) +75~−850 μm [g] | 18.94 | 18.83 |
|  | (4) −75 μm [g] | 40.92 | 24.71 |
|  | Total of from (1) to (4) [g] | 108.0 | 99.52 |
|  | Positive-pole active substance ((3) + (4)) [g] | 59.86 | 43.54 |
|  | ((3) + (4))/(total of from (1) to (4)) × 100 [%] | 55.4 | 43.8 |

As shown in Table 5, in Example 5, wherein, after dissolution and peeling-off with an alkaline solution, a treatment was performed using a surfactant solution, a weight of a positive-pole active substance after sieving out to a size of not less than 75 μm and less than 850 μm was 18.94 g, and a weight of a positive-pole active substance after sieving out to a size of less than 75 μm was 40.92 g, and hence a total weight of a separated positive-pole active substance was 59.86 g. On the other hand, in Comparative Example 2, wherein, without surfactant treatment, only peeling-off treatment by an alkaline solution was performed, a weight of a positive-pole active substance after sieving out to a size of not less than 75 μm and less than 850 μm was 18.83 g, and a weight of a positive-pole active substance after sieving out to a size of less than 75 μm was 24.71 g, and hence a total weight of a separated positive-pole active substance was 43.54 g. In addition, a recovery rate of nickel and cobalt in the recovered positive-pole active substance was 92.4% in Example 5 and Comparative Example 2 each.

Thus, in Example 5, wherein surfactant treatment was performed, a more amount of a positive-pole active substance was recovered than in Comparative Example 2 by not less than 16 g. Particularly, a weight of a positive-pole active substance having a size of 75 μm in Example 5 was approximately 1.6 times as much as in Comparative Example 2.

The above-mentioned is clearly understood from appearance photographs of FIG. 3 showing a substance after sieving out to a size not less than 2380 μm. In other words, in the appearance photograph of Example 5 shown in FIG. 3A, a positive-pole active substance which appeared black hardly adhered to positive-electrode structure materials constituting a positive-electrode material, such as a positive-electrode substrate and a separator. On the other hand, in the appearance photograph of Comparative Example 2 shown in FIG. 3B, it is clearly understood that a large amount of black positive-pole active substance adheres to positive-electrode structure materials, such as a positive-electrode substrate and a separator. Hence, it was found that, in Comparative Example 2, a positive-pole active substance, which should have been recovered, adhered to positive-electrode structure materials such as a positive-electrode substrate, and accordingly the positive-pole active substance was not separated and recovered effectively and sufficiently.

From the above, it is understood that, like Example 5, a surfactant is added to a slurry obtained by peeling-off using an alkaline solution, whereby a positive-pole active substance is dispersed in the slurry and thereby agglomeration thereof is controlled, and adhesion of a positive-pole active substance to a positive electrode substrate and the like can be controlled, and accordingly only a positive-pole active substance can be effectively recovered.

Furthermore, it is understood that peeling-off treatment by an alkaline solution and surfactant treatment are thus performed, whereby a positive-pole active substance can be recovered at a high recovery rate, and accordingly a recovery rate of valuable metals, such as nickel, cobalt, lithium, and the like, which are contained in a positive-pole active substance, can also be improved.

The invention claimed is:

1. A method for separating a positive-pole active substance from a positive-electrode substrate, the method comprising:
forming a slurry containing the positive-pole active substance by at least (i) adding an alkaline solution to a positive-electrode material including the positive-pole active substance adhered to the positive-electrode substrate, the positive-electrode material obtained from material resulting from dismantling a lithium ion battery, and (ii) dissolving the positive-electrode substrate in the alkaline solution; and
separating the positive-pole active substance from the alkaline solution by at least adding a surfactant solution to the slurry, and stirring the slurry to disperse the positive-pole active substance in the slurry.

2. The method for separating the positive-pole active substance according to claim 1, wherein the alkaline solution has a concentration of 0.3 to 1.0 N.

3. The method for separating the positive-pole active substance according to claim 1, wherein, during separating, a stirring medium is added to the slurry to which the surfactant solution is added, and stirred.

4. The method for separating the positive-pole active substance according to claim 1, wherein the surfactant solution has a concentration of 0.1 to 10% by weight.

5. The method for separating the positive-pole active substance according to claim 1, wherein the surfactant is a non-ionic surfactant having a polyoxyalkylene ether group.

6. The method for separating the positive-pole active substance according to claim 1, wherein a time of the stirring is not less than 1 hour.

7. A method for recovering valuable metals including separating a positive-pole active substance from a positive-electrode substrate, the method comprising:
forming a slurry containing the positive-pole active substance by at least (i) adding an alkaline solution to a positive-electrode material including the positive-pole active substance adhered to the positive-electrode substrate, the positive-electrode material obtained from material resulting from dismantling a lithium ion battery, and (ii) dissolving the positive-electrode substrate in the alkaline solution; and
separating the positive-pole active substance from the alkaline solution by at least adding a surfactant solution to the slurry to disperse the positive-pole active substance in the slurry.

* * * * *